United States Patent [19]

Potter

[11] Patent Number: 5,406,719

[45] Date of Patent: Apr. 18, 1995

[54] SHOE HAVING ADJUSTABLE CUSHIONING SYSTEM

[75] Inventor: Daniel R. Potter, Forest Grove, Oreg.

[73] Assignee: Nike, Inc., Beaverton, Oreg.

[21] Appl. No.: 302,397

[22] Filed: Sep. 8, 1994

Related U.S. Application Data

[63] Continuation of Ser. No. 70,921, Jun. 4, 1993, abandoned, which is a continuation-in-part of Ser. No. 786,704, Nov. 1, 1991, abandoned.

[51] Int. Cl.$^6$ .............................................. A43B 13/18
[52] U.S. Cl. .......................................... 36/28; 36/29; 36/35 B
[58] Field of Search ................. 36/28, 29, 35 B, 35 R, 36/35 B, 38, 71, 93, 153, 3 B; 251/8

[56] References Cited

U.S. PATENT DOCUMENTS

| | | |
|---|---|---|
| 900,867 | 10/1908 | Miller . |
| 1,069,001 | 7/1913 | Guy . |
| 1,304,915 | 5/1919 | Spinney . |
| 1,514,468 | 8/1922 | Schoff . |
| 1,625,582 | 4/1927 | Anderson . |
| 1,869,257 | 7/1932 | Hitzler . |
| 2,080,469 | 5/1937 | Gilbert . |
| 2,104,924 | 1/1938 | Dellea ..................... 36/38 |
| 2,645,865 | 7/1953 | Town . |
| 2,677,906 | 5/1954 | Reed . |
| 2,715,231 | 8/1955 | Marston . |
| 2,836,907 | 6/1958 | Windle ..................... 36/38 |
| 3,030,640 | 4/1962 | Gosman . |
| 3,589,037 | 6/1971 | Gallagher . |
| 3,758,964 | 9/1973 | Nishimura . |
| 3,765,422 | 10/1973 | Smith . |
| 3,990,457 | 11/1976 | Voorhees . |
| 4,017,351 | 4/1977 | Larson et al. . |
| 4,017,931 | 4/1977 | Golden . |

(List continued on next page.)

FOREIGN PATENT DOCUMENTS

| | | |
|---|---|---|
| 262803 | 2/1929 | Italy ........................... 36/35 B |
| 81605 | 10/1986 | Taiwan, Prov. of China . |
| 123336 | 3/1990 | Taiwan, Prov. of China . |
| 134162 | 9/1990 | Taiwan, Prov. of China . |
| 160500 | 6/1991 | Taiwan, Prov. of China . |
| 173484 | 11/1991 | Taiwan, Prov. of China . |
| 184346 | 5/1992 | Taiwan, Prov. of China . |
| 856622 | 12/1960 | United Kingdom . |
| 2050145 | 1/1981 | United Kingdom . |
| 89/10074 | 11/1989 | WIPO . |
| 8910074 | 11/1989 | WIPO ........................... 36/29 |
| 91/16831 | 11/1991 | WIPO . |

OTHER PUBLICATIONS

"Unstable Air Has Been Known To Do Some Serious Damage"; Etonic; 147 Centre Street, Brockton, Mass. 02402; Feb. 1990.

Primary Examiner—Paul T. Sewell
Assistant Examiner—Thomas P. Hilliard
Attorney, Agent, or Firm—Banner, Birch, McKie & Beckett

[57] ABSTRACT

A cushioning element for use in a shoe is disclosed. The cushioning element includes four fluid-filled support chambers which are compressible but not collapsible, and which are disposed at different locations throughout the midsole of the shoe. The element also includes four variable volume fluid reservoir chambers which are collapsible to reduce the volume thereof. The reservoir chambers are controllably linked in fluid communication with the support chambers so as to be selectively in full communication with or isolated from the support chambers. By selectively isolating one or more of the reservoir chambers from one or more of the support chambers, and collapsing the isolated chamber, fluid may be moved from one support chamber to another at a different location, thereby increasing the stiffness of the midsole at a selected location.

15 Claims, 12 Drawing Sheets

U.S. PATENT DOCUMENTS

| | | |
|---|---|---|
| 4,049,854 | 9/1977 | Casey et al. . |
| 4,129,951 | 12/1978 | Petrosky . |
| 4,136,412 | 1/1979 | Wilhelm . |
| 4,183,156 | 1/1980 | Rudy . |
| 4,217,705 | 8/1980 | Donzis . |
| 4,219,945 | 9/1980 | Rudy . |
| 4,287,250 | 9/1981 | Rudy . |
| 4,297,797 | 11/1981 | Meyers . |
| 4,305,212 | 12/1981 | Coomer . |
| 4,312,493 | 1/1982 | Stauffer ................................ 251/8 |
| 4,445,283 | 5/1984 | Meyers . |
| 4,446,634 | 5/1984 | Johnson et al. ........................ 36/29 |
| 4,458,430 | 7/1984 | Peterson . |
| 4,670,995 | 1/1987 | Huang . |
| 4,680,876 | 7/1987 | Peng ................................... 36/35 B |
| 4,768,295 | 9/1988 | Ito . |
| 4,873,774 | 10/1989 | Lafever .................................. 36/29 |
| 4,912,861 | 4/1990 | Huang . |
| 4,918,838 | 4/1990 | Chang .................................... 36/29 |
| 4,991,317 | 2/1991 | Lakic . |
| 5,025,575 | 6/1991 | Lakic ..................................... 36/29 |
| 5,179,792 | 1/1993 | Brantingham . |
| 5,222,312 | 6/1993 | Doyle . |
| 4,722,1131 | 2/1988 | Huang . |

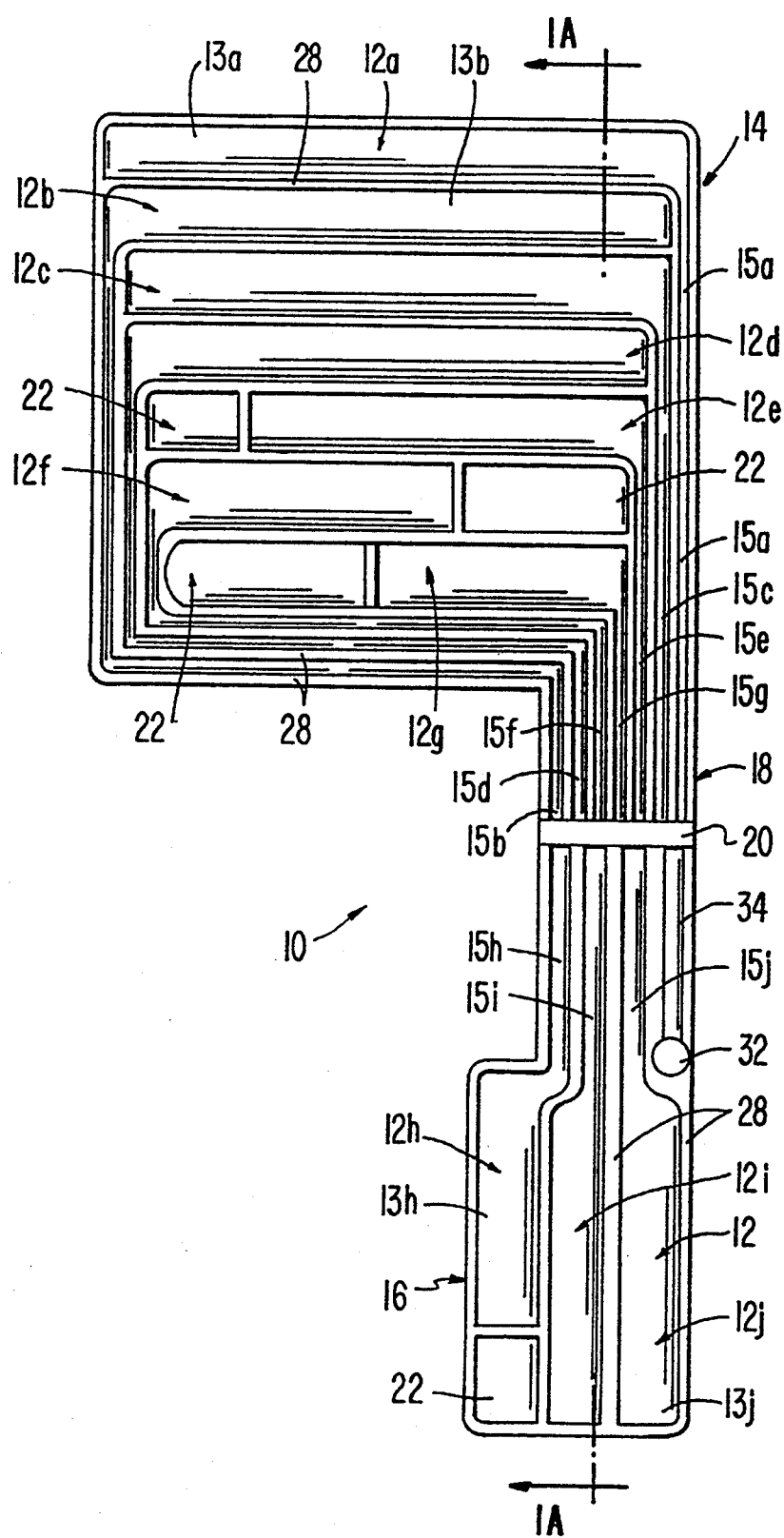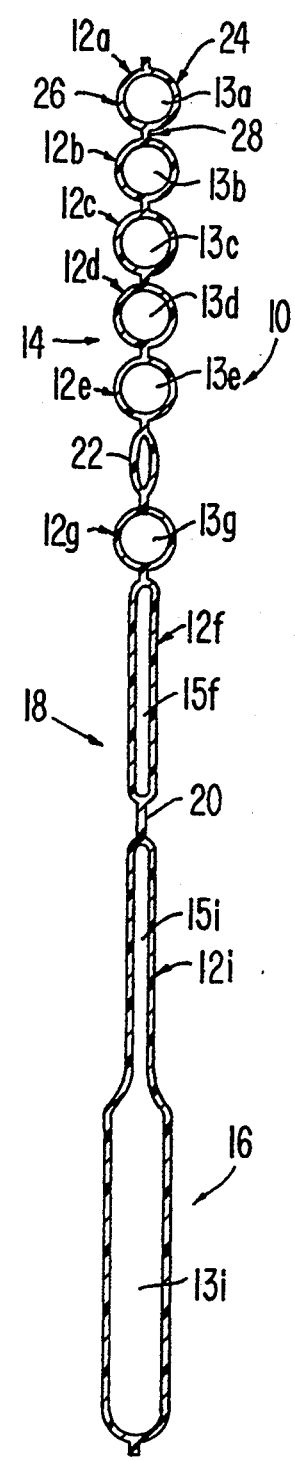

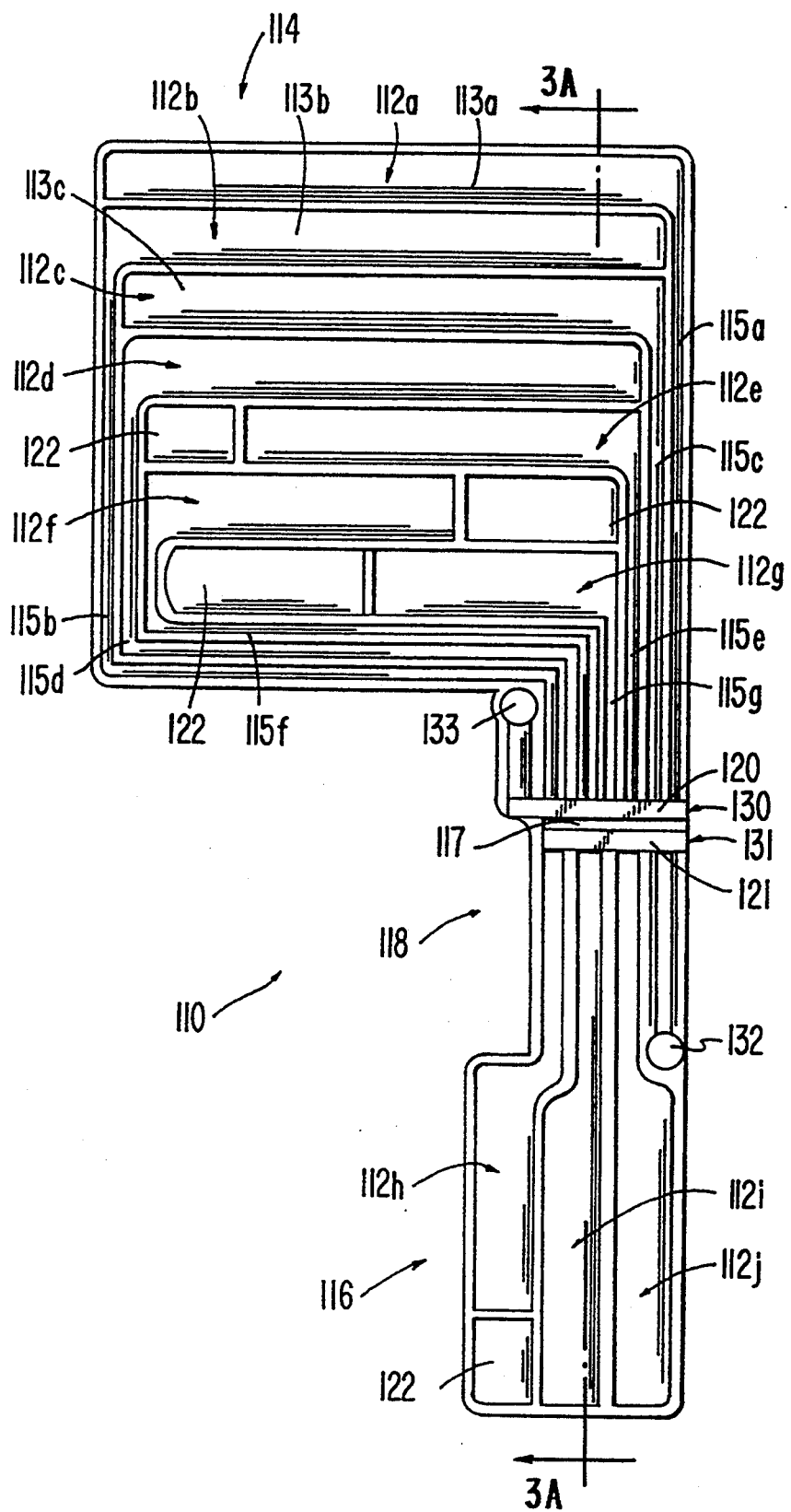
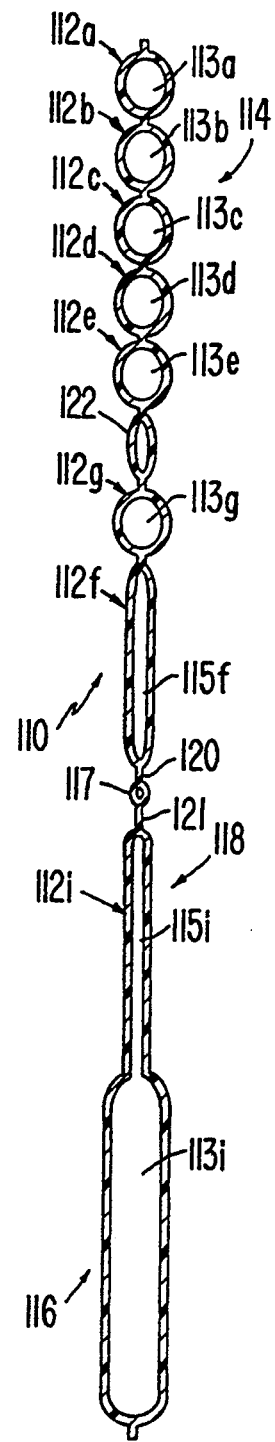
FIG.3
FIG.3A

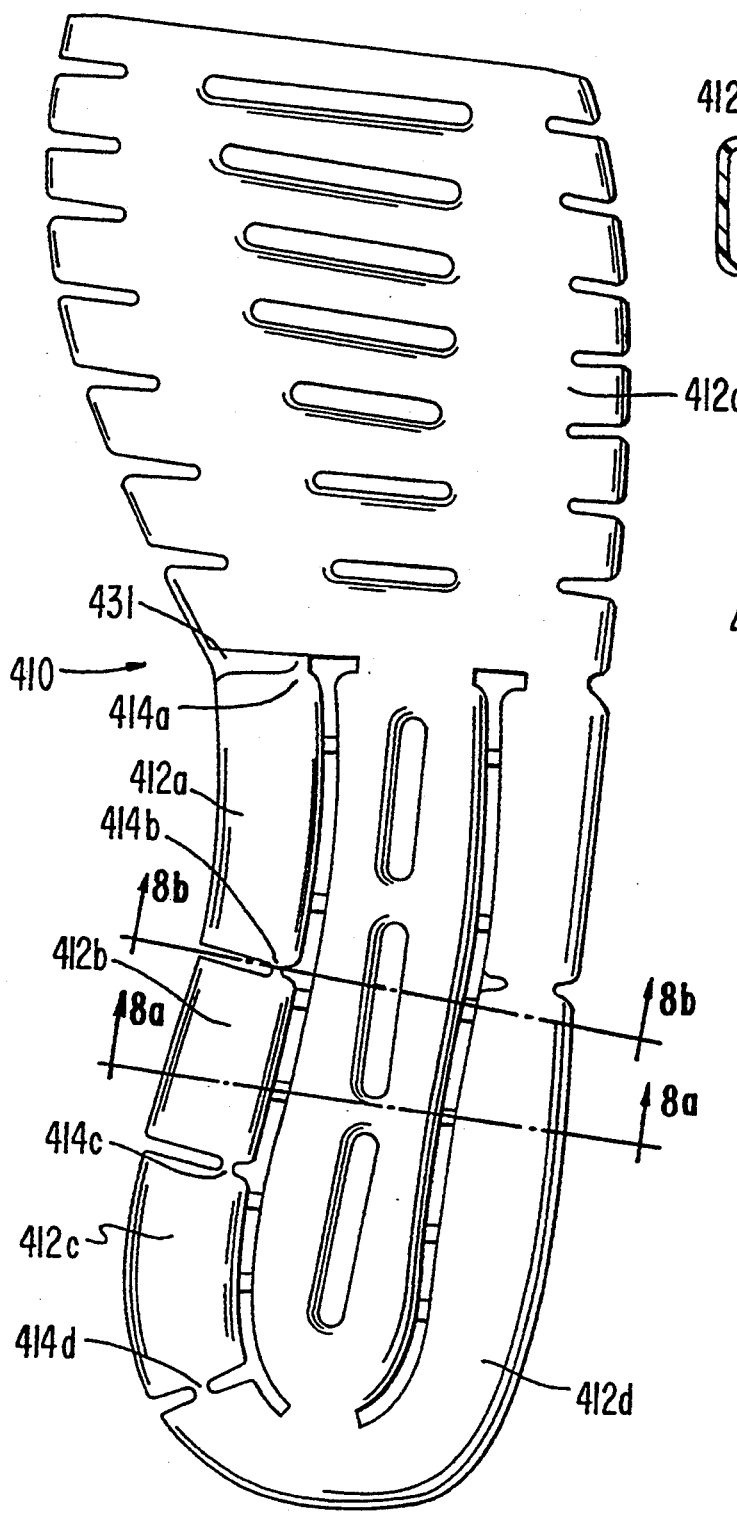
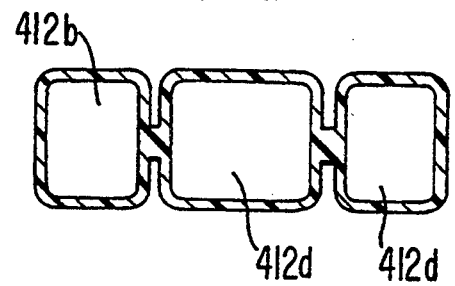
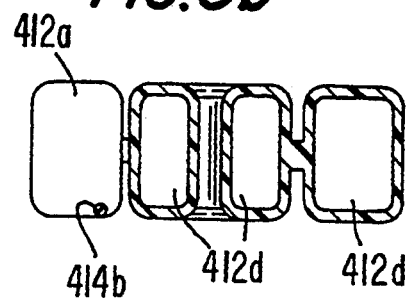

SHOE HAVING ADJUSTABLE CUSHIONING SYSTEM

This application is a continuation of application Ser. No. 08/070,921, filed Jun. 4, 1993, now abandoned, which is a continuation-in-part of application Ser. No. 07/786,704 filed Nov. 1, 1991, now abandoned.

BACKGROUND OF THE INVENTION

1. Field of the Invention

This application is directed to a cushioning system for a shoe, and in particular, a fluid-filled bladder cushioning system containing separate reservoir chambers.

2. Description of the Related Art

Bladders have long been used in shoes as a cushion to increase shoe comfort, enhance foot support, reduce the risk of injury and other deleterious effects, and decrease fatigue. In general, the bladders are comprised of elastomeric materials which are shaped to define at least one pressurized pocket or chamber. Typically, a bladder will actually define many chambers arranged in a pattern designed to achieve one or more of the above-stated objectives. The chambers may be pressurized with a number of different mediums, such as air, various gases, water, or other liquids.

Many different chamber configurations have been developed in an effort to achieve the desired results. For instance, bladders have been constructed with a single chamber that extends over the entire area of the sole. One example of this type of bladder is disclosed in U.S. Pat. No. 2,080,469 to Gilbert, entitled "Pneumatic Foot Support." Alternatively, bladders have included a number of chambers fluidly interconnected with one another. Examples of these types of bladders are disclosed in U.S. Pat. No. 4,183,156 to Rudy, entitled "Insole Construction For Articles of Footwear," hereby, incorporated by reference, and U.S. Pat. No. 900,867 to Miller, entitled "Cushion for Footwear." However, these type of bladder constructions have been known to flatten and "bottom out" when they receive high impact pressures, such as experienced in athletic activities. Such failures negate the intended benefits of providing the bladder.

In an effort to overcome this problem, bladders have been developed wherein the chambers are fluidly connected by restricted openings. Examples of these bladders are illustrated in U.S. Pat. No. 4,217,705 to Donzis, entitled "Self-contained Fluid Pressure Foot Support Device," U.S. Pat. No. 4,129,951 to Petrosky, entitled "Air Cushion Shoe Base," and U.S. Pat. No. 1,304,915 to Spinney, entitled "Pneumatic Insole." These bladders, however, have tended to either be ineffective in overcoming the deficiencies of the non-restricted bladders or have been too expensive to manufacture.

Additionally, artisans have developed shoe bladders which include a number of separate chambers that are independent of one another. In other words, the chambers are not fluidly connected. Hence, the fluid contained in any one chamber is precluded from passing into another chamber. One example of this construction is disclosed in U.S. Pat. No. 2,677,906 to Reed, entitled "Cushioned Inner Sole For Shoes and Method of Making the Same." Although this design obviates "bottoming out" of the bladder, it also requires each chamber to be individually pressurized. Thus, the cost of production has been exceedingly high. U.S. Pat. No. 4,722,131 to Huang discloses an open system type of air cushion. The air cushion has two cavities, with each cavity having a separate air valve. Thus, each cavity can be inflated to a different pressure by pumping in or releasing air as desired. However, in systems such as disclosed in Huang, a separate pump is required to increase the pressure in the cavities. Such a pump would have to be carried by the user if it is desired to inflate the cavities away from home, inconveniencing the user. Alternatively, the pump could be built into the shoe, adding weight to the shoe and increasing the cost and complexity. Additionally, open systems tend to lose pressure rapidly due to diffusion through the bladder membrane or leakage through the valve. Thus, the pressure must be adjusted often. Furthermore, a pressure gauge is necessary to determine if the desired internal pressure has been achieved. Pressure gauges are expensive, and have limited accuracy at the low pressures and volumes which would be utilized in the cavities, due to the fact that a significant volume of air is required to register a given pressure. Thus, such a large volume of air would escape during the taking of a pressure reading that the reading would be inherently inaccurate.

Another shoe bladder manufactured by Etonic also includes a plurality of discrete chambers which lack fluid interconnection. The chambers are, however, all formed at ambient pressure. This construction obviates the need to individually pressurize each chamber and thus results in less manufacturing costs. However, the use of chambers pressurized above ambient pressure is not possible. As a result, the versatility and potential gain from using the bladder is reduced.

Attempts have further been made to design the bladders to suit specific needs. For example, the support and cushion needed for jogging would be different than that needed for aerobics. In bladders having either restricted connections between chambers or independent chambers, artisans have sought to differentiate the pressures in the various chambers depending on the part of the plantar surface to be supported and the activity to be engaged. Examples of this practice include U.S. Pat. No. 4,445,283 to Meyers, entitled "Footwear Sole Member," the '705 patent to Donzis, the '906 patent to Reed, the '951 patent to Petrosky, and the '915 patent to Spinney. These approaches, however, have not been entirely successful. With respect to the restricted flow bladders, the results have had only limited success in actually providing the desired differences in pressure. Although the independent bladders effectively provide different pressures at various points across the sole, the cost to manufacture the bladders has been prohibitively high. As illustrated in FIGS. 3 and 7 in the '906 patent to Reed, each independent chamber must be individually pressurized. As can be readily appreciated, this process is not suitable for mass production, particularly in bladders having a significant number of chambers.

SUMMARY OF THE INVENTION

The present invention is directed to a cushioning element for use in a shoe. The cushioning element includes a fluid-filled support chamber and a variable volume fluid reservoir chamber. The reservoir chamber is collapsible to reduce the volume thereof, and is linked in fluid communication with the support chamber.

In a further embodiment, the reservoir chamber is controllably linked to the reservoir chamber so as to be selectively in full communication with or isolated from the reservoir chamber.

In a further embodiment, the cushioning element includes a connecting element linking the support chamber and the reservoir chamber in fluid communication. A control element is disposed to control the opening and closing of the connecting element to allow the chambers to be controllably linked. The connecting element is a resiliently collapsible tube, and the control element includes a screw disposed adjacent the collapsible tube. The position of the screw relative the tube is adjustable such that the screw may be moved into contact with the tube to adjustably collapse the tube and thereby control the fluid communication of the reservoir chamber and the support chamber.

In a further embodiment the cushioning element includes a screw-threaded chamber in which the reservoir chamber is disposed, and a screw element disposed and vertically moveable within the screw-threaded chamber. The screw element allows the reservoir chamber to be collapsed a desired amount so as to cause the reservoir chamber to have a desired volume and allows for maintaining of the desired volume.

BRIEF DESCRIPTION OF THE DRAWINGS

FIG. 1 is a top plan view of a bladder of the present invention;

FIG. 1a is a cross-sectional view taken along line 1a—1a in FIG. 1;

FIG. 3 is a top plan view of a second embodiment of a bladder of the present invention;

FIG. 3a is a cross-sectional view taken along line 3a—3a in FIG. 3;

FIG. 8 is a top plan view of a fifth embodiment of the present invention at an interim stage of its fabrication;

FIG. 8A is a cross-sectional view taken along line 8A—8A in FIG. 8; and

FIG. 8B is a cross-sectional view taken along line 8B—8B in FIG. 8.

DETAILED DESCRIPTION OF THE PREFERRED EMBODIMENT

Figure 4:
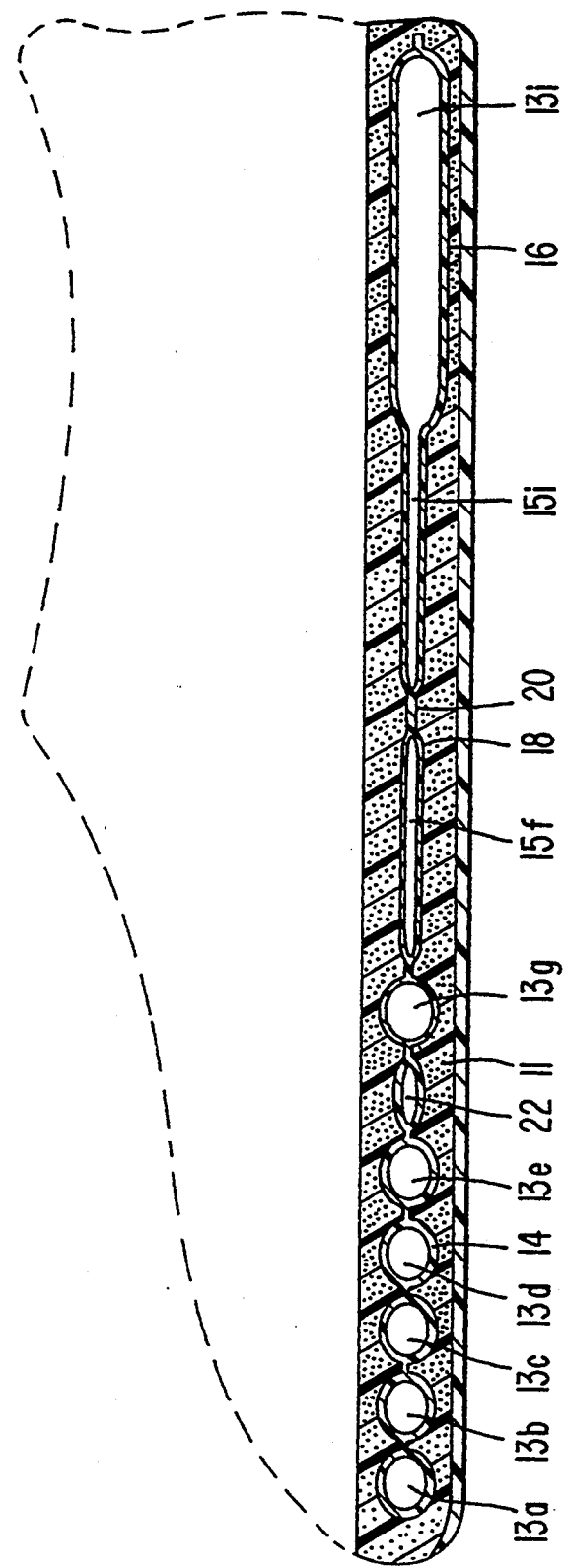
FIG. 4 is a cross-sectional view of the bladder shown in FIG. 1a contained within a midsole of a shoe.

In a preferred embodiment of the invention (FIGS. 1 and 1a), a bladder 10 is a thin, elastomeric member defining a plurality of chambers or pockets 12. The chambers are pressurized to provide a resilient support. Bladder 10 is particularly adapted for use in the midsole of the shoe, but could be included in other parts of the sole or have applicability in other fields of endeavor. In a midsole, bladder 10 would preferably be encapsulated in an elastomeric foam 11 (FIG. 4). As is well known in the art, the foam need not fully encapsulate the bladder. Moreover, the bladder can be used to form the entire midsole or sole member.

Preferably, bladder 10 is composed of a resilient, plastic material such as a cast or extruded ester base polyurethane film having a shore "A" hardness of 80 to 95 (e.g., Tetra Plastics TPW-250) which is inflated with hexafluorethane (e.g., Dupont F-116) or sulfur hexafluoride. However, other materials and fluids having the requisite characteristics, such as those disclosed in U.S. Pat. No. 4,183,156 to Rudy, could also be used. Further, the bladders can also be fabricated by blow molding or vacuum forming techniques.

As a bladder midsole, bladder 10 defines a forefoot support 14, a heel support 16, and a medial segment 18 interconnecting the two supports. Chambers 12 each define a support portion 13 and a channel portion 15. The support portions 13 are raised to provide a resilient resistance force for an individual's foot. The channel portions 15 are relatively narrow in comparison to support portions 13, and are provided to facilitate the unique manufacturing process described below. Forefoot and heel supports 14, 16 are comprised primarily of support portions 13 so that a cushioned support is provided under the plantar areas receiving the greatest impact pressure during use of the shoe. Channel portions 15, while extending partially into the forefoot and heel supports 14, 16, are concentrated in medial segment 18.

In forefoot support 14, the support portions 13 are arranged parallel to one another in a lateral direction across the sole to provide a suitable flexibility in the forefront sole portion and to apportion the cushioned resistance as desired. Nonetheless, different chamber arrangements could be used.

In the illustrated athletic shoe, forefoot portion 14 includes chambers 12a-g. Chambers 12a-g are of varying sizes, with the chambers nearer to the front (e.g., chamber 12a) defining a larger volume than those closer to medial segment 18 (e.g., chamber 12g). As will be described more fully below, all of the chambers 12a-g are pressurized to the same level. However, due to the different volumes of the chambers, they will each possess a unique resistance. In other words, the chambers with smaller volumes will provide a firmer support than the chambers with larger volumes, because the movement of a side wall defining a smaller chamber will involve a greater percentage of the volume of air being displaced than the same movement in a larger chamber. Hence, for example, chamber 12g will provide a firmer support than chamber 12a.

Channel portions 15a-g of chambers 12a-g, in general, extend rearwardly from support portions 13a-g to a seal 20 located transversely across medial segment 18.

Channel portions 15 are essential to the unique manufacturing process described below. Preferably, channel portions 15 are provided along the sides of forefoot portion 14, so that the needed cushioned support is not taken from the central portions of the sole where it is most needed. In the illustrated embodiment, channel portions 15 for adjacent chambers 12 are placed on opposite sides of the sole. Of course, other arrangements could be used.

Additionally, in forefoot portion 14, void chambers 22 are defined adjacent the more rearward chambers 12e–g. A void chamber 22 is a chamber that has not been pressurized. Void chambers 22 exist because of the need to limit the volume of chambers 12e–g to provide a certain firmness in these portions of the bladder. Nevertheless, void spaces are not essential to the present invention and could be eliminated. In a midsole usage (FIG. 4) the resilient foam 11 would fill in the void space and provide ample support to the user's foot.

In a manner similar to forefoot support 14, heel support 16 includes a row of chambers 12h–j. In the illustrated bladder, three chambers 12h–j are provided. The support portions 13h–j of these chambers are arranged parallel to one another in a generally longitudinal direction across the sole to ensure that all three chambers provide cushioned support for all impacts to the user's heel. Nonetheless, as with the forefoot portion, different chamber arrangements could be used. Additionally, each chamber 12h–j includes a channel portion 15 which extends from the support portion 13 to seal 20. In the same manner as in forefoot support 14, chambers 12h–j provide different resistance forces in the support of the heel. For example, the smaller chamber 12h will provide a firmer resistance than the larger chambers 12i or 12j. The firmer chamber 12h would act as a medial post in reducing pronation.

In the first embodiment of the invention (FIG. 1), chambers 12h–j are pressurized to the same internal pressure as chambers 12a–g. One preferred example of internal pressure for athletic footwear is 30 psi. Of course, a wide variety of other pressures could be used. In an alternative embodiment of the invention (FIG. 3), chambers 112h–j are pressurized to a different internal pressure than chambers 112a–g. As one preferred example, the pressure in the forefoot portion could be set at 35 psi, while the heel portion could be pressurized to 30 psi. The particular pressure in each section though will depend on the intended activity and the size of the chambers, and could vary widely from the given examples.

Figure 2:
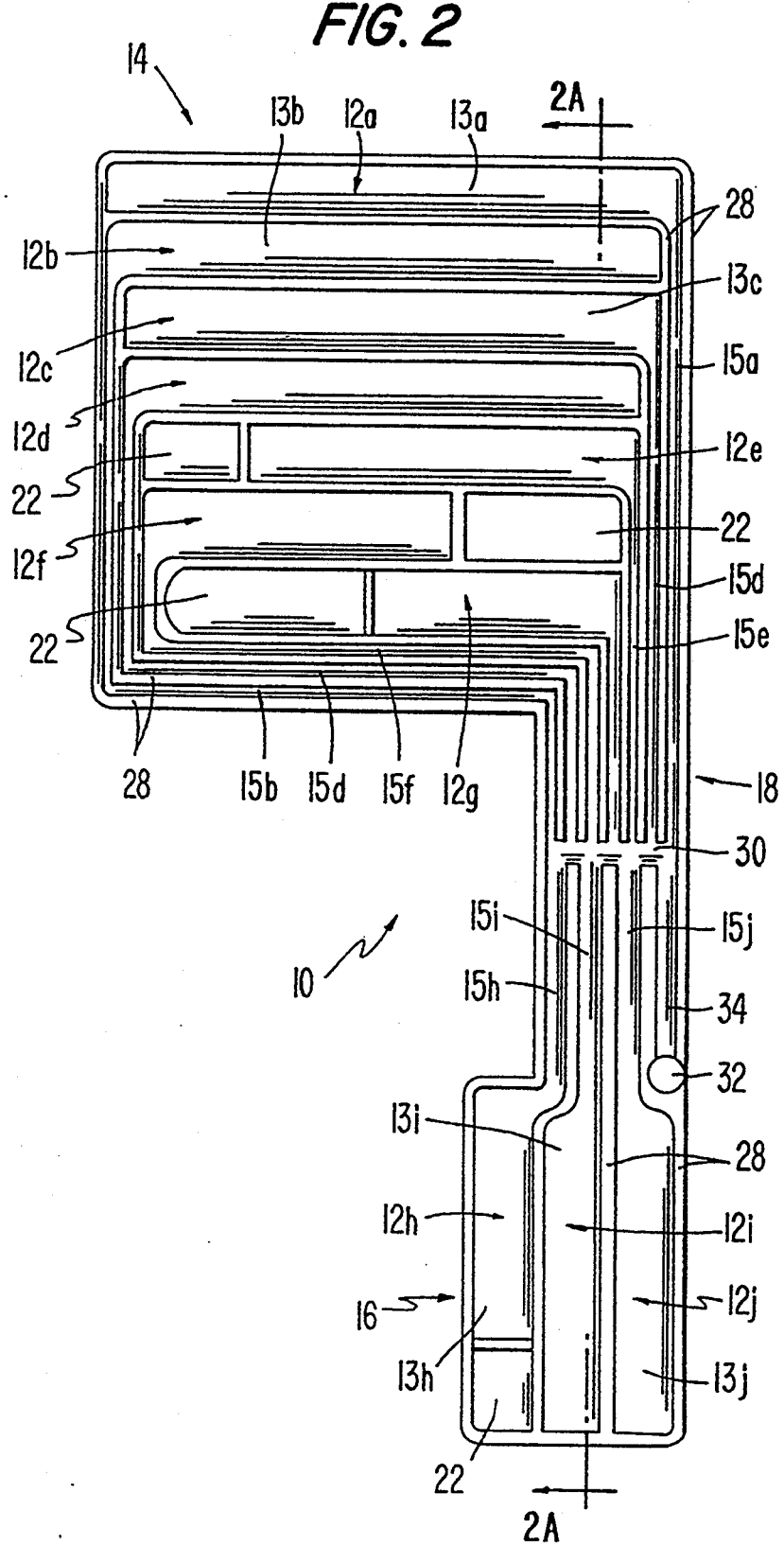
FIG. 2 is a top plan view of a bladder of the present invention at an interim stage of its fabrication.
Figure 2A:
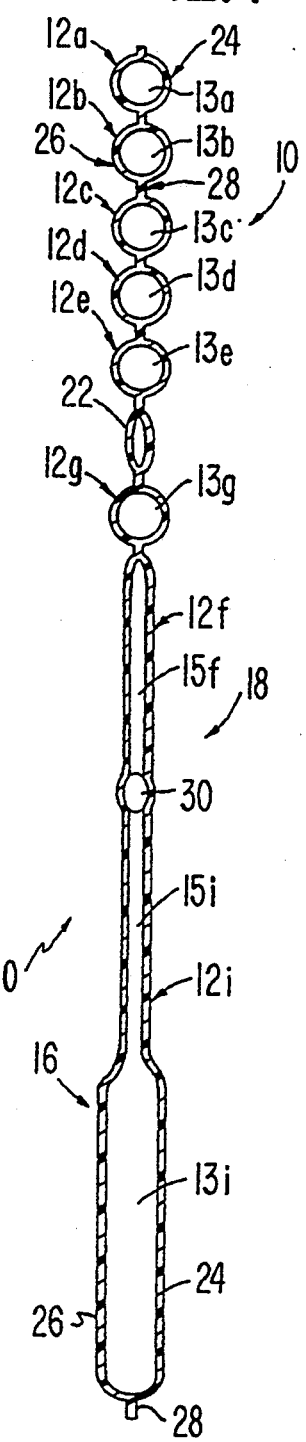
FIG. 2a is a cross-sectional view taken along line 2a—2a in FIG. 2.

In the fabrication of bladder 10, two elastomeric sheets 24, 26 are preferably secured together to define the particular weld pattern illustrated in FIG. 2; that is, that the two opposed sheets 24, 26 are sealed together to define wall segments 28 arranged in a specific pattern (FIG. 2a). The welding is preferably performed through the use of radio frequency welding, the process of which is well known. Of course, other methods of sealing the sheets could be used. Alternatively, the bladder could also be made by blow molding or injection molding, the processes of which are also well known.

When the bladder is initially welded (or otherwise formed), a common area 30 is defined at the location where seal 20 is formed (FIG. 2). Common area 30 is fluidly coupled with all of the channel portions 15 of chambers 12a–j, so that all of the chambers are in fluid communication with one another.

An injection pocket 32 is provided to supply bladder 10 with a quantity of fluid. Injection pocket 32 is in fluid communication with a pressurizing channel 34, which, in turn, is fluidly coupled to common area 30 (FIGS. 2 and 2a). Chambers 12a–j, therefore, are pressurized by inserting a needle (not shown) through one of the walls 24, 26 defining injection pocket 32, and injecting a pressurized fluid therein. The pressurized fluid flows from pocket 32, through channel 34, into common area 30, through channel portions 15a–j and into the supporting portions 13a–j of all of the chambers 12a–j. Once the predetermined quantity of fluid has been inserted into the bladder, or alternatively when the desired pressure has been reached, channel 34 is temporarily clamped.

Walls 24, 26 are welded, or otherwise heat sealed, forming seal 20 (FIG. 1) to completely close common area 30 so that none of the chambers are in fluid communication with any of the other chambers. Although, it may in certain circumstances be desirable to provide interconnecting ports in other portions of the sidewalls of selected chambers. Once sealing weld 20 has been made, the needle is removed and channel 34 remains an uninflated void area. Hence, as can be readily appreciated, this unique independent chamber design can be fabricated by the novel process in an easy, quick, and economical manner.

The fabrication of a second embodiment (FIG. 3) is similar to that of the first embodiment (FIG. 1). In particular, bladder 110 defines a forefoot support 114, a heel support 116, and a medial segment 118. The forefoot and heel supports 114, 116 each include a plurality of chambers 112. Specifically, forefoot support 114 includes chambers 112a–g and heel support 116 includes chambers 112h–j. Similarly, each chamber 112 includes a support portion 113 and a channel portion 115. Void chambers 122 are also provided to achieve the desired firmness in chambers 112e–g and 112h.

In contrast to the first embodiment, forefoot support 114 and heel support 116 are divided by a sealing wall 117 across me, dial segment 118 prior to the supply of any pressurized fluid. In addition, a common area 130, 131 is defined immediately adjacent each side of the sealing wall 117. Common area 130 is in fluid communication with channels 115a–g, and common area 131 is in fluid communication with channels 115h–j.

In the fabrication of bladder 110, a needle (not shown) is inserted into each injection pocket 132, 133. In practice, two separate needles are preferably used, although one needle can be successively employed to inject fluid into each support 114, 116 if desired. By providing two separate injection pockets 132, 134 and sealing wall 117, different pressure levels may be supplied into the two separated forefoot and heel supports 114, 116. For instance, forefoot support 114 may be provided with a greater pressure (e.g., 35 psi) than the pressure (e.g., 30 psi) in heel support 116, to meet the specific resistance desired for the intended use of the shoe. Of course, the heel support could be provided with a greater pressure than the forefoot support if desired.

Once all of the chambers have been fully pressurized, the two common areas 130, 131 are then welded (or otherwise heat sealed) to form seals 120, 121. Seals 120, 121 function to close the fluid communication between the chambers so that each chamber is independent and separate from the remaining chambers. Once the seals have been formed the needles can be removed and injection pockets 132, 134 become uninflated void areas.

Figure 5:
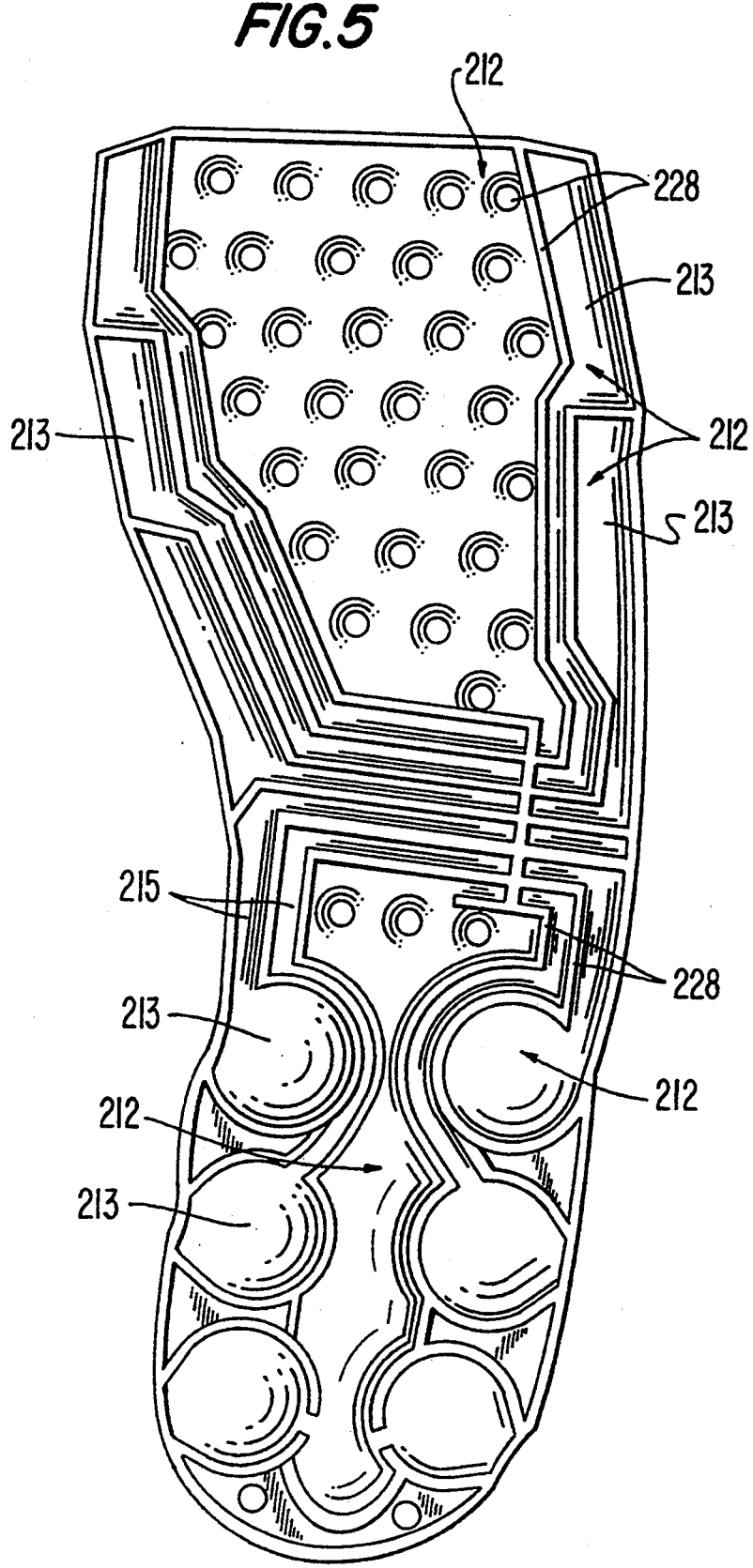
FIG. 5 is a top plan view of a third embodiment of the present invention.
Figure 6:
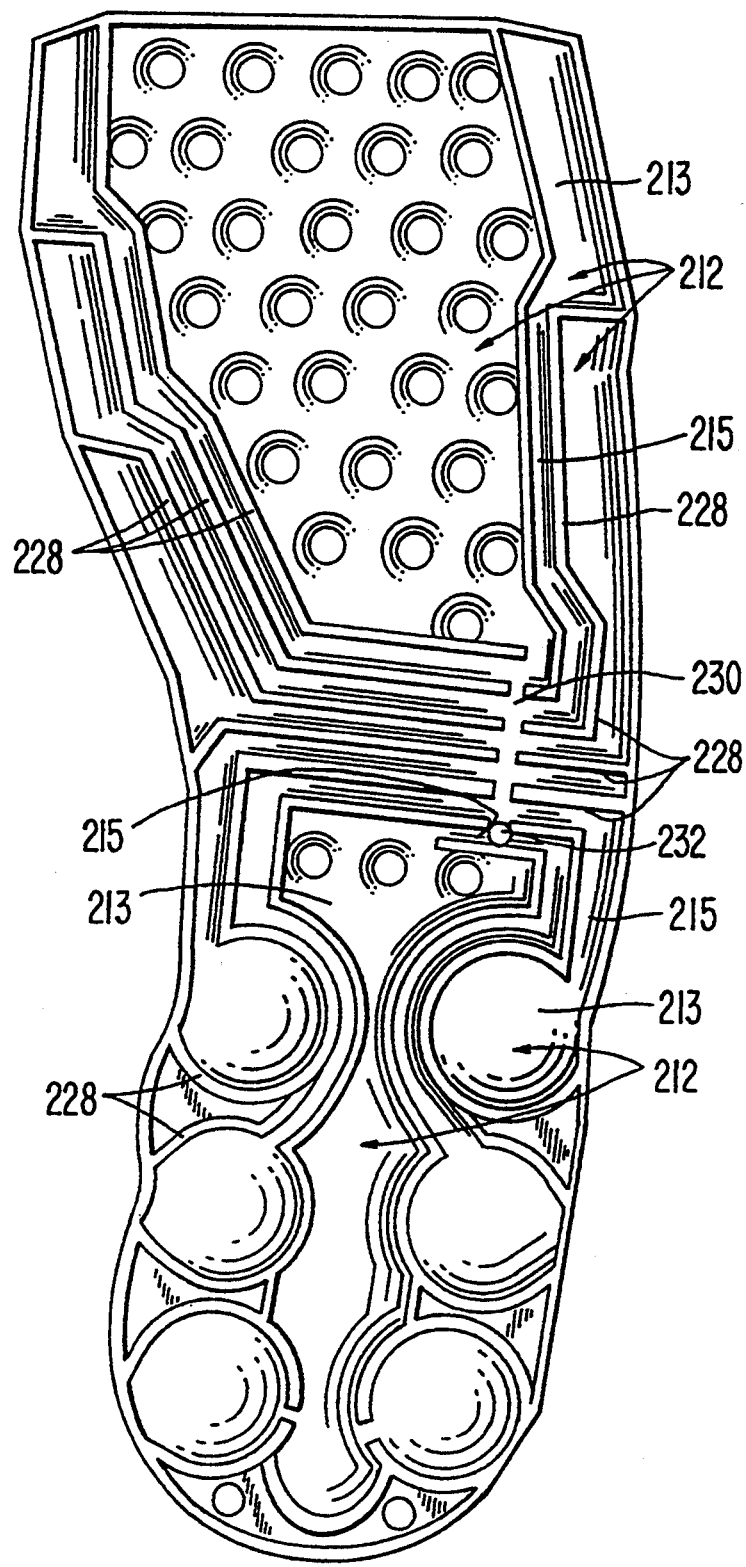
FIG. 6 is a top plan view of the third embodiment at an interim stage of its fabrication.

As can be appreciated, many different chamber configurations are possible. See for instance, FIG. 5 which includes a significantly different weldment pattern 228 defining a plurality a chambers 212. Like the earlier embodiments, the chambers 212 each includes a support portion 213 and a channel portion 215. The channel portions all fluidly interconnect the support portions 213 with a common area 230 (FIG. 6). Once the chambers have been pressurized by inserting a pressurizing needle in pocket 232, the common area is sealed so that each chamber is separated from the other chambers (FIG. 5).

Figure 7:
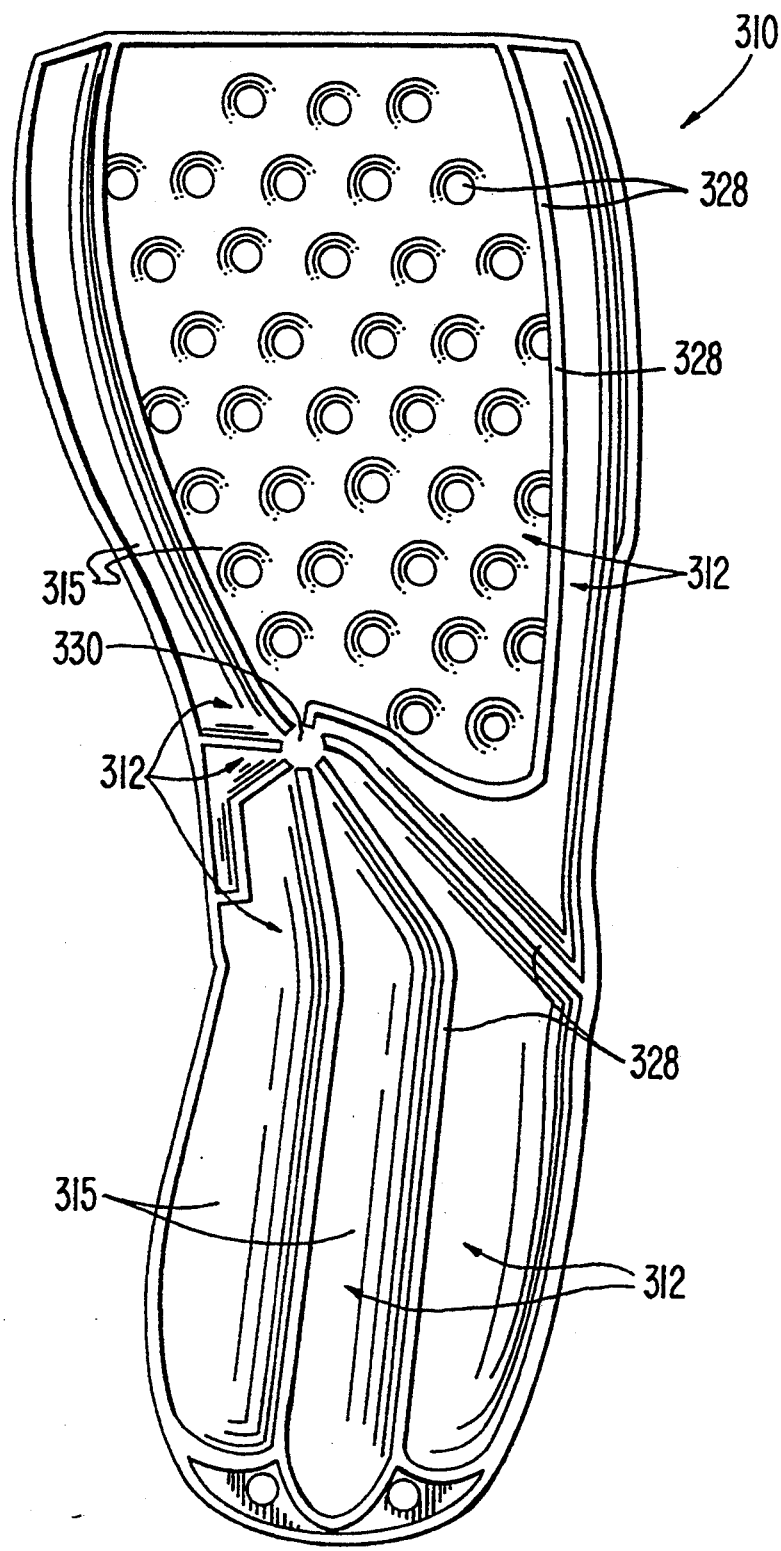
FIG. 7 is a top plan view of a fourth embodiment of the present invention at an interim stage in its fabrication.

In another embodiment (FIG. 7), the bladder 310 is designed such that the channel portions are eliminated. More specifically, bladder 310 is formed by a weldment pattern 328 defining a plurality of chambers 312 comprised solely of support portions 315. The chambers are initially all fluidly interconnected via common area 330. Once the bladder has been fully pressurized, the common area 330 is sealed off to eliminate the fluid interconnection between the chambers (not shown).

FIG. 8 illustrates a bladder 410 which has been blow molded. In this embodiment, a plurality of chambers 412a–d are arranged into a unique pattern. The chambers are fluidly interconnected by ports 414b–d. Of course other patterns of chambers and ports could be used. In any event, this embodiment does not include a common area to which each chamber is joined. Rather, the chambers 412 are sequentially interconnected.

Once the chambers have been formed, a needle is inserted into the side of pocket 431 to pressurize the chambers. As can be readily appreciated, the chambers 412 are pressurized by the fluid passing sequentially through chambers 412a–d and ports 414a–d. When the fluid injection is complete, the ports 414a–d are sealed to separate the chambers from one another (not shown). The sealing process is preferably formed in a single step by a specially configured die.

Figure 9:
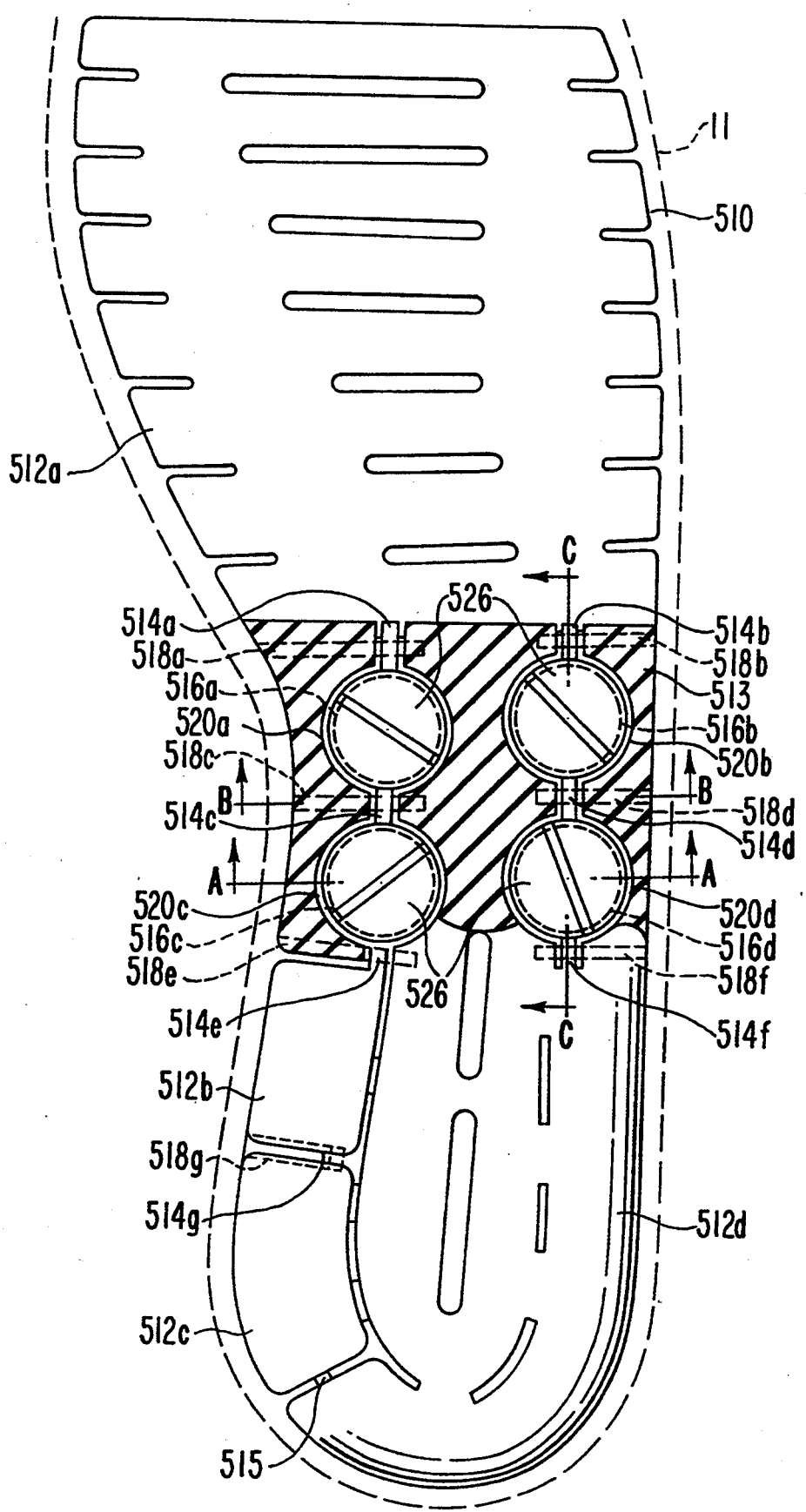
FIG. 9 is a top plan view of a sixth embodiment of the invention showing an adjustable cushioning system including compressible reservoirs.
Figure 9A:
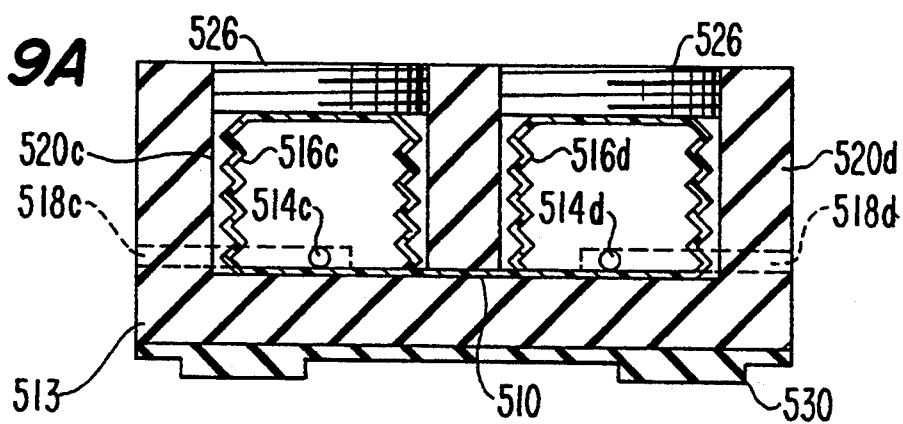
FIG. 9A is a cross-sectional view taken along line A—A in FIG. 9.
Figure 9B:
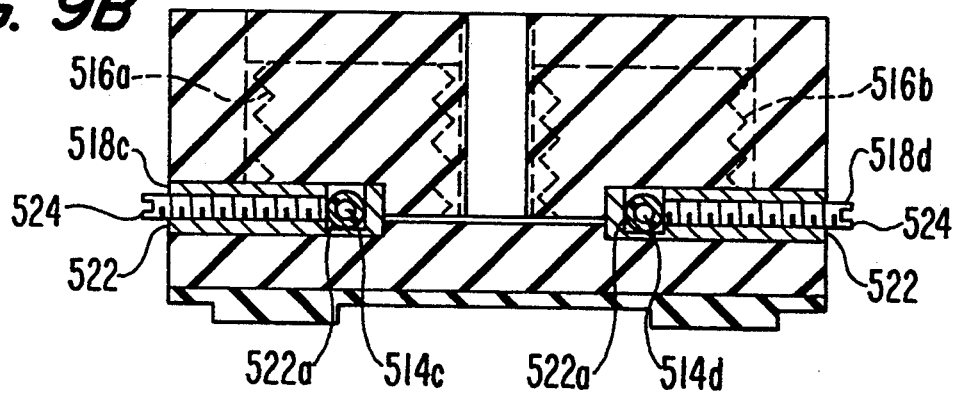
FIG. 9B is a cross-sectional view taken along line B—B in FIG. 9.
Figure 9C:
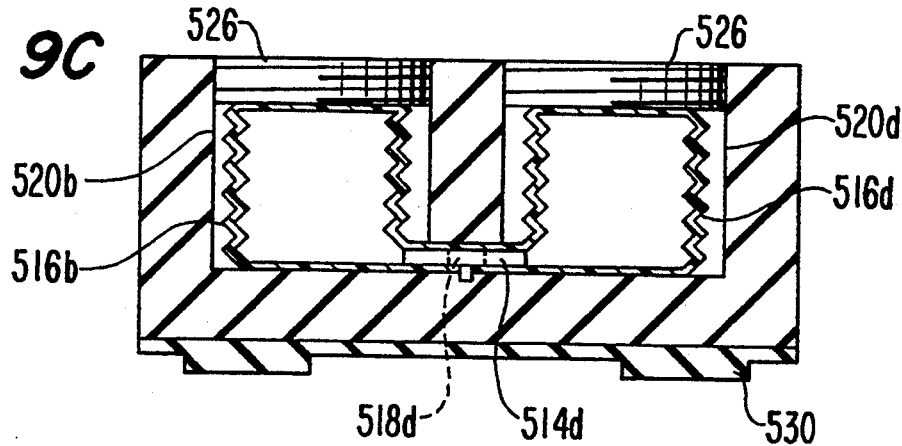
FIG. 9C is a cross-sectional view taken along line C—C in FIG. 9.

With reference to FIGS. 9–9c, a further embodiment of the invention is shown, in which, the pressure in the various chambers may be selectively varied in a known manner in a closed cushioning system. In FIG. 9, cushioning element or bladder 510 includes four separate gas-filled post support storage chambers 512a–d. Chambers 512 compress and stiffen when a load is applied in order to provide cushioning but do not collapse upon themselves. Forward medial support chamber 512b and rearward medial support chamber 512c are disposed on the medial side in the heel region, and extend approximately ⅓ of the width of the bladder. Lateral chamber 512d also is disposed in the heel region, and extends from the medial side for approximately ⅔ of the width of the bladder. Chambers 512b–d are spaced from each other.

Chambers 512b and 512c are linked by interconnecting tube or port 514g which may be selectively opened or closed by pinch-off valve 518g, the operation of which is discussed in greater detail below. Chambers 512c and 512d also may be linked by port 5 15 to facilitate initial pressurization of the chambers. However, as shown in FIG. 9 and discussed above, if desired, port 515 may be permanently sealed to prevent fluid flow between chamber 512c and chamber 512d. Chamber 512a forms the forward portion of cushioning element 510, and extends generally across the width of the sole. Chamber 512a is formed as a separate element from chambers 512b–d, with foam element 513 disposed therebetween, and is not linked directly in fluid communication with any of chambers 512b–d. Thus, cushioning element 510 would include separate bladder elements, although as described below, the cushioning element could comprise a single integrally formed bladder element.

Foam element 513 forms the arch portion of the cushioning element and includes cylindrical openings 520a–d formed partially or fully therethrough. Variable volume reservoir chambers 516a-d are disposed within openings 520a–d, respectively. Chambers 516a–d have a bellows shape which allows the chambers to collapse upon themselves to reduce the volume. Front medial reservoir chamber 516a is linked in fluid communication with front support chamber 512a by interconnecting tube or port 514a, and with rear medial compressible reservoir 516c by interconnecting tube 514c. Rear medial reservoir chamber 516c is linked in fluid communication with forward medial post chamber 512b by interconnecting tube 514c. Front lateral reservoir chamber 516b is linked in fluid communication with front support chamber 512a by interconnecting tube 514b, and with rear lateral reservoir chamber 516d by interconnecting tube 514d. Rear lateral reservoir chamber 516d is further linked in fluid communication with lateral support chamber 512d by interconnecting tube 514f. The opening and closing of each of interconnecting tubes 514a–g is controlled by a corresponding valve 518a–g, described further below.

Cushioning is provided by the confined gas in chambers 512a–d, and any load on any part of a given chamber will instantaneously increase the pressure equally throughout the whole chamber. The chamber will compress to provide cushioning, stiffening but not collapsing, due to the increase in pressure of the contained gas. When open, interconnecting tubes 514 do not restrict the flow between support chambers 512 and reservoirs 516, and two support chambers and/or reservoirs connected by an open tube function dynamically as a single chamber. Thus, when all of tubes 514 are open, cushioning element 510 functions as a substantially unitary bladder providing cushioning throughout the midsole.

Figure 12:
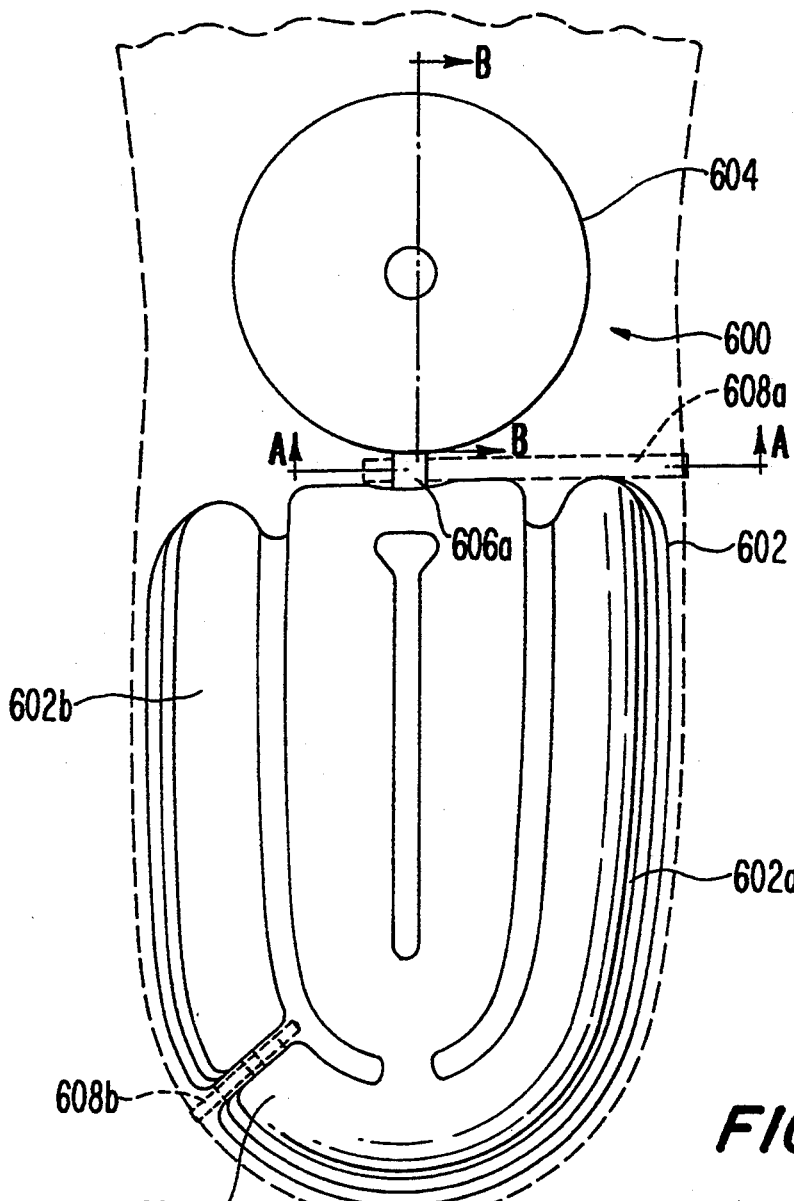
FIG. 12 is a top plan view of a seventh embodiment of the invention showing a modified adjustable cushioning system including a compressible reservoir.
Figure 12B:
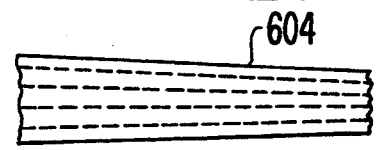
FIG. 12B is a cross-sectional view taken along line B—B in FIG. 12.
Figure 12A:
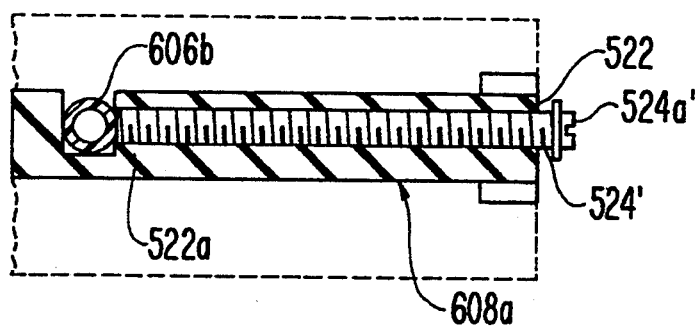
FIG. 12A is a cross-sectional view taken along line A—A in FIG. 12.

Valves 518 may comprise any suitable valve known in the art, for example, a pinch-off valve including a screw as shown in FIGS. 9A, 9B and 12A. With reference to FIG. 9A, valves 518, for example, valve 518c, includes hollow rivet 522 disposed in a hole extending partially through foam element 513 from one end thereof. Rivet 522 includes an indented or blank portion 522a extending radially therethrough at the inner end. The inner wall of rivet 522 is screw-threaded, and adjusting screw 524 is disposed therein. The position of screw 524 within rivet 522b can be adjusted by rotation of the screw. In the embodiment shown in FIGS. 9, screw 524 has a slotted head for this purpose, and easily may be rotated by any flat edge element. In the embodiment shown in FIG. 12A, screw 524' includes screw cap 524a' which extends exterior of the foam element, and preferably rests flat upon the side of the foam element when screw 524 is disposed fully within rivet 522. Cap 524a' allows for the position of screw 524' to be adjusted by rotation thereof by manual manipulation without the use of a flat-edge object. Screws 524 preferably are made of light weight plastic.

Interconnecting tubes 514 are disposed within indented portion 522a. The fluid communication may be controlled by adjusting the extent to which screws 524 extend within region 522b. When screws 524 are disposed out of contact with tubes 514, the fluid flows substantially freely between reservoirs 516 and/or support chambers 512. When screws 524 are in the innermost position, they fully contact and pinch-off tubes 514, preventing fluid flow substantially completely.

Figure 10:
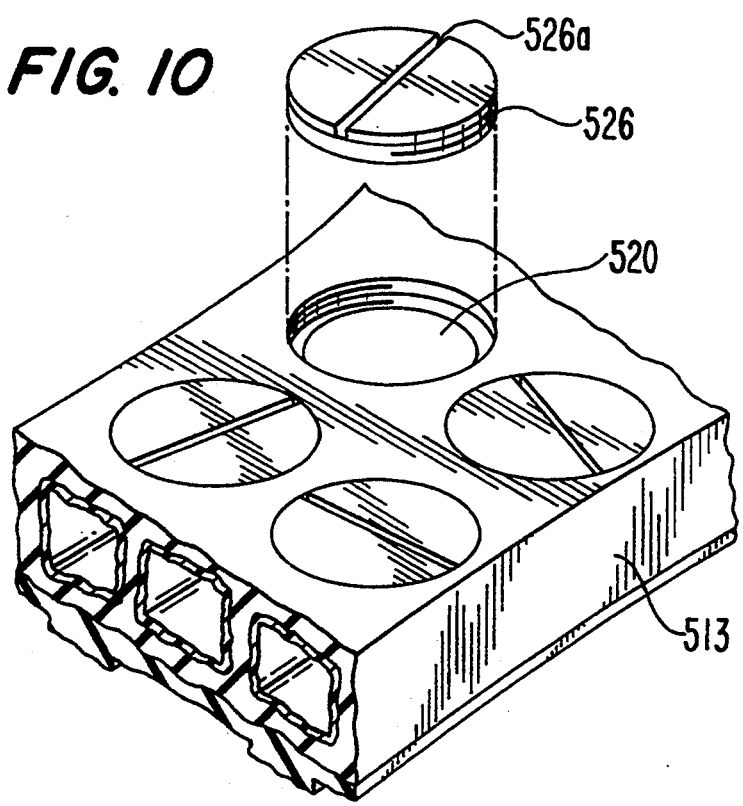
FIG. 10 is an overhead perspective view showing a portion of the midsole.
Figure 11:
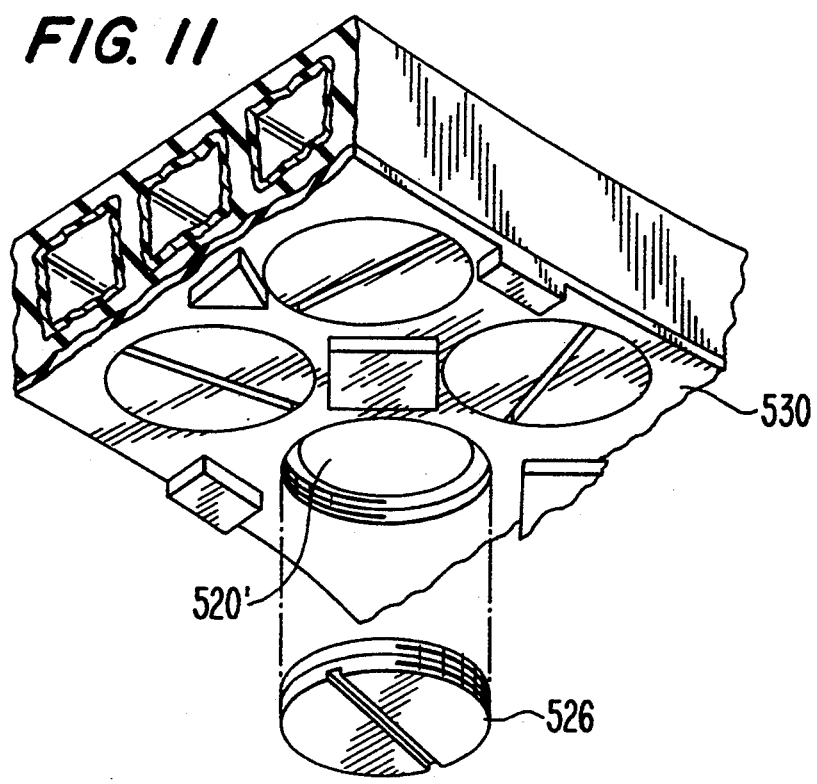
FIG. 11 is an underside perspective view showing a portion of the cushioning system.

As discussed, reservoirs 516a–d are disposed within cylindrical holes 520a–d formed in foam element 513. The interior of holes 520 are screw-threaded and form containing chambers for reservoirs 516. With reference to FIG. 10, flat screws 526 are disposed in respective holes 520a–d. Downward rotation of screws 526 brings the screws into contact with and compresses reservoir chambers 516. Accordingly, each reservoir 516 can be adjusted to and maintained at a desired volume by simple rotation of the corresponding flat screw 526 which causes the reservoir to collapse. When reservoirs 516 are at their maximum volume, the top of screws 526 are level with the top of holes 520. Screws 526 are made of a light-weight material such as plastic, and may include slots 526a to allow for rotation by a flat-head instrument. However, due to the light-weight nature of both screws 526, chambers 518 and foam element 513, only a minimal downward force is needed to collapse reservoirs 516 and retain reservoirs 516 at the desired volume. Thus, only a minimal torque will be needed to rotate screws 526 to the desired level. Thus, it is foreseen that adequate rotation could be provided by a common item such as a dime, paper clip or even the tip of the wearer's finger. If a sock liner is provided, corresponding holes could be provided therethrough as well to provide ease of access. With further reference to FIG. 11, holes 520' can be formed through outsole 530 to allow access to hole 520 from below, and thus to allow reservoirs 516 to be collapsed from below as well. Holes 530 are screw-threaded, and screws 526 are disposed therein.

By making use of reservoirs 516a–d and tubes 514, the degree of pressurization and thus the stiffness of each support chamber 512a–d can be adjusted to provide customized cushioning at different locations of the shoe, without requiting gas to be added to or leaked from the bladder. For example, if it is desired to increase the resistance to compression in the medial rear portion of the shoe, the pressure in one or both of support chambers 512b and 512c may be increased in the following manner. Screw 524 of valve 518a would be rotated into contact with connecting tube 514a, fully compressing the tube and preventing the flow of gas therethrough so as to isolate medial front reservoir 516a from support chamber 512a. Reservoir 516a would be collapsed by rotation of the corresponding flat screw 526, forcing gas therefrom and into reservoir 516c and me, dial support chambers 512b and 512c. Thereafter, reservoir 516c also would be collapsed forcing gas therefrom and into medial support chambers 512b and 512c. Screw 524 of pinch-off valve 518e would be rotated so as to compress the connecting tube, isolating reservoirs 516a and 516c from support chambers 512b and 512c.

The mass of the gas in chambers 512b and 512c has been increased, and since chambers 512b and 512c are now isolated from the other support chambers of the bladder, their effective volume is reduced. Thus, the pressure in chambers 512b and 512c is increased. As a result, when chambers 512b and 512c are loaded, element 510 has an increased resistance to compression and is stiffer at the location of support chambers 512b and 512c. If desired, the resistance to compression of chambers 512b and 512c can be further increased by closing tube 514c, making the chambers independent of each other and decreasing their effective volumes further. Thus, when a load is localized at one or the other of chambers 512b or 512c, the stiffness of the loaded chamber is increased since gas flow to the other chamber is prevented. For most people, during walking or running the foot rolls forwardly from the heel. Thus, chamber 512c experiences maximum loading separately from chamber 512b. As the foot rolls forwardly, the stiffness of each chamber is increased as it receives the maximum load beyond the maximum stiffness when the chambers are in communication. Accordingly, the overall stiffness experienced by the wearer is increased.

The pressure in both of chambers 512b and 512c could be further increased by reopening interconnecting tube 514a and rotating flat screws 526 into their uppermost position to allow additional gas to flow from support chamber 512a into collapsible reservoirs 516a and 516c. The process described above is then repeated to force the gas from reservoirs 516a and 516c into chambers 512b and 512c to further increase their stiffness. This process can be completed until any desired stiffness is obtained. In a similar manner, the effective volumes of chambers 512a and/or 512d can be adjusted by performing similar manipulations on reservoirs 516b and 516d. In fact, by making use of all four reservoirs 516, gas may be transferred from any one of chambers 512 to any of the other chambers to increase or decrease the stiffness of the bladder at a desired location, to thereby tune the overall cushioning characteristics of the midsole for a particular activity or for a specific gait characteristic of the wearer. For example, a wearer who tends to strike the ground at the midfoot or the forefoot may prefer that forefoot chamber 512a be more compliant. In this case, the fluid pressure could be transferred to the three rearward chambers. Similarly, a wearer who strikes the ground at the lateral rear may prefer that chamber 512d be less resistant and that forefoot chamber 512a be more resistant, in which case the fluid pressure could be transferred to chamber 512a from chamber 512d.

Furthermore, the overall pressure in chambers 512a–d and thus element 510 as a whole, can be reduced by pumping and storing gas into reservoirs 516a–d. For example, connectors 514a, 514b, 514e and 514f could be closed to isolate reservoirs 516a–d from support chambers 512a–d. Reservoirs 516a–c could be compressed to force fluid into reservoir 516d. Thereafter, connector 514d could be closed to isolate reservoir 516d. Reopening connectors 514a, 514b and 514e and allowing reservoirs 516a–c to expand by rotating flat screws 526 into their uppermost positions would lower the pressure in support chambers 512a–c. The process could then be repeated for reservoir 516c to further lower the overall pressure in bladder 510.

Although as shown in FIG. 9, cushioning element 510 includes two separate bladder elements, that is, chamber 512a is formed as a separate element from chambers 512c–d, cushioning element 510 could be a single integral element in which chamber 512a could extend rearwardly to the forward boundary of chambers 512b and 512d, with foam element 513 eliminated. However, the portion of chamber 512a which would be disposed in the arch area of the shoe would be thinner than the remainder of chamber 512a, so as to allow pinch-off valves 518 to be disposed either above or below chamber 512a, and would include cylindrical holes formed therethrough for placement of reservoir chambers 516. Separate wall elements having internal threading could be disposed in the holes to allow for the use of flat screws 526. In this construction, chamber 512a would still be isolated by an internal wall from fluid communication with chambers 512b and 512d. Of course, bladder 510 could be formed as a single element, including reservoirs 516.

The present invention provides for an infinite number of variations of pressure and thus stiffness at various locations in the midsole, without requiring that gas be supplied to or released from the bladder. That is, the variations in pressure are achieved in a closed system. Thus, the attendant drawbacks of open air systems such as leakage or the requirement for an external pump are avoided. It is preferred that reservoir chambers 516 be placed in the arch or midfoot area as shown. This area receives relatively low loads and a closed reservoir in this location which would yield limited cushioning would not pose a problem, especially where foam element 513 is used. However, it is possible to locate the reservoirs at any convenient location, even outside of the midsole such as on the upper. Although one particular configuration of the various support chambers and reservoirs is shown, other configurations could be used. For example, chamber 512a or 512d could be broken into several smaller chambers linked in fluid communication by interconnecting tubes.

With reference to FIGS. 12, 12a and 12b, an alternative embodiment of the invention disclosed in FIGS. 9–11 is shown. Cushioning unit 600 includes heel support cushion 602 and collapsible reservoir chamber 604, linked in fluid communication by interconnecting tube 606a. Pinch-off valve 608a is disposed to control the opening and closing of tube 606a. Heel cushion 602 includes main chamber 602a, and medial post chamber 602b linked thereto by interconnecting tube 606b. Pinch-off valve 608b is disposed to control the opening and closing of interconnecting tube 606b. Reservoir chamber 604 has a bellows shape and may be collapsed to vary the contained volume thereof. Although not shown, the volume of reservoir chamber 604 could be adjusted and fixed in the same manner as reservoirs 516 in FIGS. 9–11, that is, by the use of flat screws.

When reservoir chamber 604 and heel cushion 602 are in full communication, that is, when interconnecting tube 606a is fully opened, the overall effective volume of the unit is the sum of the volumes of both chamber 604 and heel cushion 602. By compression of reservoir chamber 604, the gas contained in reservoir 604 is pumped into heel cushion 602. If tube 606a is closed, the overall effective volume of the unit is decreased to that of heel cushion 602. Thus, the resistance to compression of heel cushion 602 is increased, providing more stiffness at the heel of the shoe. In a preferred embodiment, the volume of chamber 604 when fully expanded is half of the volume of heel cushion 602. Thus, if chamber 604 is compressed fully, the effective pressure of heel cushion 602 is increased 1.5 times. For example, if the starting overall pressure of unit 600 and thus, of heel cushion 602 is 20 psi, the pressure in heel cushion 602 would be increased to 30 psi by fully compressing chamber 604. Additionally, since the overall volume of unit 600 is decreased by one third when chamber 604 is compressed fully, the combined effect is to further stiffen heel cushion 602. Of course, the pressure in heel cushion 602 can be increased to a lesser extent by only partially compressing chamber 604. The pressure in heel cushion 602 can be increased further if interconnecting tube 606b is closed before compression of chamber 604 so that none of the gas in chamber 604 flows into post chamber 602b.

If desired, the pressure in medial post chamber 602b can be increased beyond that of main chamber 602a of heel cushion 602 by collapsing chamber 604, and then isolating post chamber 602b from main chamber 602a by closing tube 606b. If tube 606a is not closed, then the overall effective volume of main chamber 602a, which remains in communication with reservoir chamber 604 will only be reduced by the volume of post chamber 602b. Further, the mass of fluid contained in post chamber 602b will be increased. Since the volume of chamber 602b is significantly smaller than that of chamber 602a, the pressure in chamber 602a will be reduced slightly, while the pressure in chamber 602b will be increased greatly. Thus, heel cushion 602 will be stiffer at chamber 602b than at the remaining portion thereof.

In the embodiments of FIGS. 9–12, it is preferred that the units be manufactured by vacuum-forming or blow-molding. Radio frequency welding of sheet film to form the bladder would also work. The preferred film is polyester polyurethane manufactured by Tetra Plastics. The preferred inflatant fluid is sulfurhexafloride gas $SF_6$; however, any gas or combination of gases will work.

I claim:

1. A cushioning element for use in a shoe, said cushioning element comprising:
   a fluid-filled support chamber;
   a variable volume fluid reservoir chamber, said reservoir chamber collapsible to reduce the volume thereof, both said fluid-filled support chamber and said reservoir chamber closed to the external environment and sharing the same mass of fluid;
   a connecter linking said support chamber and said reservoir chamber in fluid communication; and
   collapsing and maintaining means for collapsing said reservoir chamber to a reduced volume and for maintaining the reduced volume, wherein,
   the collapsing of said reservoir chamber forces fluid from said reservoir chamber into the support chamber with the combined mass of fluid contained in said support chamber and said reservoir chamber maintained substantially constant.

2. The cushioning element recited in claim 1 further comprising a control element disposed to control the opening and closing of said connector to allow said chambers to be controllably linked in fluid communication.

3. The cushioning element recited in claim 2, said connecter comprising a resiliently collapsible tube, said control element comprising a screw disposed adjacent said collapsible tube, wherein, the position of said screw relative to said tube is adjustable such that said screw may be moved into contact with said tube to adjustably collapse said tube and thereby control the fluid communication of said reservoir chamber and said support chamber.

4. The cushioning element recited in claim 1, said means for collapsing and maintaining comprising a screw-threaded chamber in which said reservoir chamber is disposed, and a screw element disposed and vertically moveable within said screw-threaded chamber.

5. The cushioning element recited in claim 2 comprising a forward and a rearward reservoir chamber, said forward reservoir chamber controllably linked in fluid communication with said rearward reservoir chamber by a connector having a control element disposed to control the opening and closing thereof, a forward support chamber disposed forward of said forward reservoir chamber, said forward support chamber controllably linked in fluid communication with said forward reservoir chamber by a connector having a control element disposed to control the opening and closing thereof, and a rearward support chamber disposed rearwardly of said rearward reservoir chamber, said rearward support chamber controllably linked in fluid communication with said rearward reservoir chamber by a connector having a control element disposed to control the opening and closing thereof.

6. The cushioning element recited in claim 1, the shoe comprising a sole, said support chamber and said reservoir chamber forming part of the sole.

7. The cushioning element recited in claim 2, said control element comprising a valve.

8. The cushioning element recited in claim said 7, said valve comprising a pinch-off valve.

9. The cushioning element recited in claim 1, said cushioning element comprising foam disposed about said support chamber and said reservoir chamber.

10. The cushioning element recited in claim 1, said fluid-filled chamber disposed in a heel portion of the shoe and said reservoir disposed forwardly of said fluid-filled chamber.

11. The cushioning element recited in claim 1, said reservoir chamber having a bellows shape.

12. The cushioning element recited in claim 1 comprising two said reservoir chambers disposed in an arch area of the shoe and three said support chambers, a first said support chamber disposed in the forepart of the shoe, a second said support chamber disposed in the lateral rear of the shoe and the third said support chamber disposed in the medial rear of the shoe, one said reservoir chamber linked in fluid communication by connectors with both said first and said second support chambers, the other said reservoir chamber linked in fluid communication by connectors with both said first and said third support chambers.

13. The cushioning element recited in claim 1 comprising:

four said reservoir chambers, said reservoir chambers disposed in the arch area of the shoe, said four reservoir chambers including a first medial forward reservoir chamber, a second medial rearward reservoir chamber, a third lateral forward reservoir chamber and a fourth lateral rearward reservoir chamber;

four said support chambers, a first said support chamber disposed in the forepart of the shoe, a second said support chamber disposed in the lateral rear of the shoe, and a third and fourth said support chamber both disposed in the medial rear of the shoe, said fourth support chamber disposed rearwardly of said third support chamber; wherein, said first reservoir chamber is linked in fluid communication by connecters with both said first support chamber and said second reservoir chamber, said second reservoir chamber is linked in fluid communication by connecters with both said first reservoir chamber and said third support chamber, said third reservoir chamber is linked in fluid communication by connecters with both said first support chamber and said fourth reservoir chamber, and said fourth reservoir chamber is linked in fluid communication by connecters with both said third reservoir chamber and said second support chamber.

14. The cushioning element recited in claim 1, said fluid-filled support chamber comprising a gas-filled support chamber, wherein, both said support chamber and said reservoir chamber share the same mass of gas.

15. In a shoe bladder closed to the external environment and including first and second fluid-filled chambers, a method for increasing the resistance of the first fluid-filled chamber, said method comprising the steps of:

increasing the mass of fluid contained in the first chamber by reducing the volume of the second chamber and thereby forcing fluid into the first chamber from the second chamber and simultaneously reducing the effective volume of the first chamber; and maintaining the reduced effective volume and increased mass at a desired level by maintaining the reduced volume of the second chamber.

* * * * *